(12) United States Patent
Guerra et al.

(10) Patent No.: US 12,705,385 B1
(45) Date of Patent: Aug. 11, 2026

(54) SYSTEMS AND METHODS FOR SHARING USER DATA

(71) Applicant: UIPCO, LLC, San Antonio, TX (US)

(72) Inventors: Oscar Guerra, San Antonio, TX (US); Megan Sarah Jennings, San Antonio, TX (US); Dustin Bowen Bitter, Lehi, UT (US); Pooja Krishnaswamy, McKinney, TX (US); Donald Nathaniel Holloway, III, San Antonio, TX (US); Nikhil Dama, Apex, NC (US)

(73) Assignee: UIPCO, LLC, San Antonio, TX (US)

( * ) Notice: Subject to any disclaimer, the term of this patent is extended or adjusted under 35 U.S.C. 154(b) by 1150 days.

(21) Appl. No.: 17/710,659

(22) Filed: Mar. 31, 2022

(51) Int. Cl.
*G06F 21/62* (2013.01)

(52) U.S. Cl.
CPC .. *G06F 21/6245* (2013.01); *G06F 2221/2115* (2013.01)

(58) Field of Classification Search
None
See application file for complete search history.

(56) References Cited

U.S. PATENT DOCUMENTS

2008/0172382 A1* 7/2008 Prettejohn ........... H04L 63/1483 707/999.009
2019/0392173 A1* 12/2019 Brannon ............. G06F 21/6245
2021/0390190 A1* 12/2021 Walker ............... G06Q 30/0236
2022/0179978 A1* 6/2022 Stroila ............... G06F 21/6245

OTHER PUBLICATIONS

Chen, J., He, J., Cai, L. and Pan, J., 2018. Disclose more and risk less: Privacy preserving online social network data sharing. IEEE Transactions on Dependable and Secure Computing, 17(6), pp. 1173-1187. (Year: 2018).*
Hu, H., Ahn, G.J. and Jorgensen, J., Dec. 2011. Detecting and resolving privacy conflicts for collaborative data sharing in online social networks. In Proceedings of the 27th annual computer security applications conference (pp. 103-112). (Year: 2011).*

* cited by examiner

*Primary Examiner* — Luu T Pham
*Assistant Examiner* — Edward X Long
(74) *Attorney, Agent, or Firm* — Fletcher Yoder, P.C.

(57) ABSTRACT

A data sharing system may facilitate sharing of data with third party systems. In one example, a data sharing request from a third party system is accepted or denied based on previously shared user data with the third party system. The data sharing request can be identified as being a potential privacy risk based on an overlap between the previously shared user data and the user data in the request.

11 Claims, 9 Drawing Sheets

Figure 15:
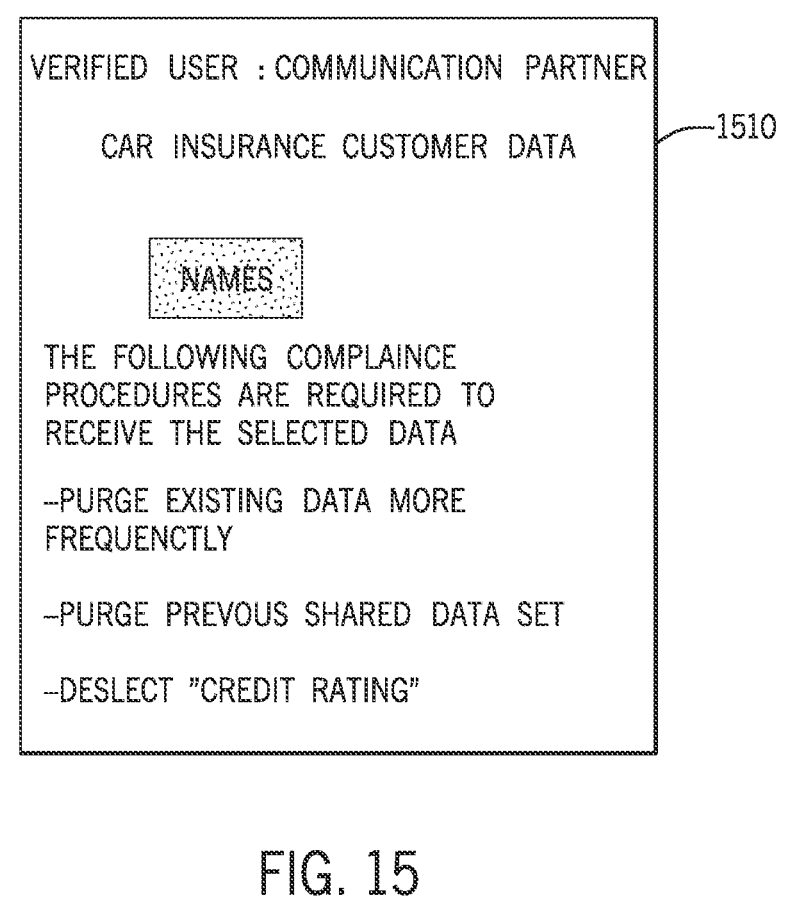

VERIFIED USER : COMMUNICATION PARTNER

CAR INSURANCE CUSTOMER DATA

NAMES

THE FOLLOWING COMPLAINCE PROCEDURES ARE REQUIRED TO RECEIVE THE SELECTED DATA

-PURGE EXISTING DATA MORE FREQUENCTLY

-PURGE PREVOUS SHARED DATA SET

-DESLECT "CREDIT RATING"

SYSTEMS AND METHODS FOR SHARING USER DATA

BACKGROUND

The present disclosure relates generally to systems and methods related to management of data shared between parties. More specifically, the present disclosure relates to techniques for assessing privacy or security risks of shared data for parties on one or both ends of a data sharing transaction.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Companies collect data related to individuals for various purposes. For example, companies may require a person to provide certain personal information to provide services, complete transactions, target advertising, accept job applications, and hire employees. In some cases, companies share data with other entities such as affiliates or third parties to create efficiencies, increase accuracy in the data, and provide a better overall experience for the customer. In one example, the affiliates may be vendors that provide back office support, e.g., customer service.

In recent years, businesses have set standards and entered into contracts that set or outline obligations and restrictions, and legislators have enacted various laws and regulations relating to accessing or sharing data, due in part to concerns about privacy and identity theft. The various laws, contracts, and policies governing data sharing can apply separately or in concert, increasing complexity, making it difficult to determine what data may be shared and under what circumstances it is appropriate based on privacy risks.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a data sharing system is provided that includes a memory storing executable instructions and a processor configured to execute the instructions. The instructions include instructions to store user data of a plurality of users in the memory; receive a request for the user data from a third party system; access previously shared user data shared with the third party system; identify a privacy risk based on a combination of the user data and the previously shared user data; and transmit a notification to the third party system to modify the request for user data to reduce the privacy risk.

In another embodiment, a data sharing system is provided that includes a memory storing executable instructions and a processor configured to execute the instructions. The instructions include instructions to receive a request for the user data from a third party system; access previously shared user data shared with the third party system; identify a privacy risk based on a combination of the user data and the previously shared user data; transmit an instruction to the third party system to purge the previously shared user data; receive confirmation that the third party system has purged the previously shared user data; and share the user data with the third party system responsive to receiving the confirmation.

In yet another embodiment, a data sharing system is provided that includes a memory storing executable instructions and a processor configured to execute the instructions. The instructions include instructions to receive a request for user data from a third party system, wherein the request comprises a plurality of requested data fields; identify one or more privacy risks in the user data; generate a risk map for the user data in the request, wherein the risk map comprises a visual or numerical marker of a risk for one or more data fields of the plurality of requested data fields; transmit the risk map to the third party system; receive a modified request from the third party system that removes the one or more data fields from the plurality of requested data fields; and share user data of the modified request with the third party system responsive to receiving the modified request.

BRIEF DESCRIPTION OF THE DRAWINGS

Various aspects of this disclosure may be better understood upon reading the following detailed description and upon reference to the drawings in which:

FIG. 15 is a schematic illustration of a user interface for a data sharing tool, in accordance with an embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code. When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
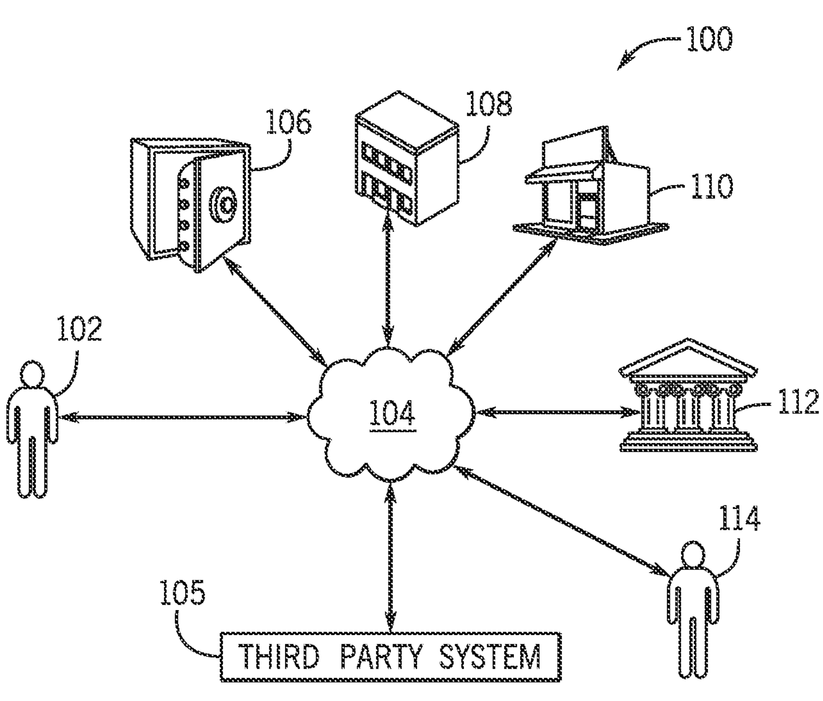
FIG. 1 is a schematic illustration of an environment in which a data sharing system may operate, in accordance with an embodiment.

The present disclosure details various embodiments for management of shared data. FIG. 1 illustrates an example environment 100 in which a data sharing system 104 may operate, in accordance with embodiments described herein. In one embodiment, the user data that can be shared by the data sharing system 104 may include public data, non-public data, and non-public personally identifiable (PPI) data. PPI data is personal information that is not in the public domain and pertains to an identifiable person. In addition, the environment 100 can provide users with various distinct services, e.g., banking, insurance, that are separately managed on different platforms.

One or more users 102 can interact with the environment 100 via a user device or other devices that are coupled to the system 104. As discussed herein, a user can be a customer or member of an organization that manages, administers, or is otherwise affiliated with the system 104 to control sharing of data pertaining to one or more users 102. For example, the system 104 can be administered by a healthcare entity, and the user 102 can be a patient of the healthcare entity. In another example, the user 102 can be an account holder with a financial institution that manages the system 104. In an embodiment, the data sharing system 104 can be administered by an organization that has a responsibility to keep a portion of the user data private.

The data sharing system 104 may facilitate data sharing between different organizations or individuals. For example, the data sharing system 104 may permit sharing of data pertaining to the user 102. The user data can be stored in a memory, and the system 104 is able to access the stored user data. In an embodiment, the user data is at least partially stored in servers of a cloud storage system 106. Other incoming data that can be considered user data may be provided by companies and institutions 108 (e.g., educational institutions, government institutions, healthcare organizations), merchants and retailers 110, financial institutions 112, and other users 114. The user data may include transactions of the user 102 in the environment 100 that can be accessed by the data sharing system 104 and that can be shared with a third party system 105. In general, the data sharing system 104 may maintain user information for the user 102, companies and institutions 108, merchants and retailers 110, financial institutions 112, other users 114, and the like.

In some embodiments, the data sharing system 104 may facilitate user authentication, which is a technology area that deals with identifying individuals in a system (such as a country, a network, or an enterprise) and controlling access to resources or services within the environment 100.

The disclosed embodiment permit determination of a risk map for various third party system 105 to assess data sharing risk of already shared data and to predict risks that may develop from existing or future data requests. Each third party system 105 can be required to be under a certain overall risk level to participate in data sharing. Thresholds can be set as limits for risks. For example, it may be overly risky to provide an employer name and a general geographic location (e.g., zip code) for a member to a third party system 105. This is because there may be a very limited number of employees of the indicated employer in the corresponding location, which may allow for identification of a particular user. Certain fields include unique identifiers, such as social security number. These represent the biggest risk, and this data can be treated differently from a risk map standpoint. The overall risk is based on a combination of all data fields shared with a particular third party system 105. The system 104 can then assess potential decrease in risk that comes from tokenizing or withholding certain fields. Thus, an output of the system 104 can be a set of data fields to be shared without modification, a set of tokenized data fields, and/or a set of restricted or not shared data fields.

Figure 2:
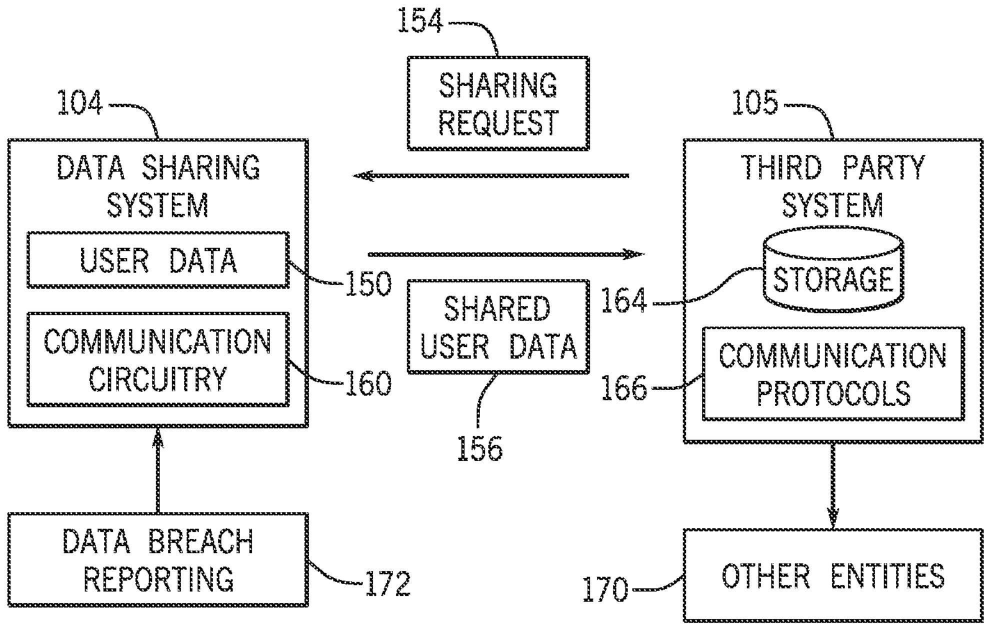
FIG. 2 is a block diagram of a data sharing arrangement, in accordance with an embodiment.

FIG. 2 is a block diagram of an embodiment of a data sharing arrangement between the data sharing system 104 and an example third party system 105. It should be understood that the data sharing system 104 may communicate with one or more different third party systems 105 to share data as generally provided herein. A used herein, a third party or a third party system 105 may refer to any entity that is not an affiliated entity, owner, parent, or subsidiary of the manager of the data sharing system 104. A third party entity may have a contractual relationship with the manager, such as a service provider. In one example, a third party may provide cafeteria services or health care services for members or customers of manager of the data sharing system 104.

The third party system 105 may not have access to user data 150 without permission from the data sharing system 104. In the depicted arrangement, the user data 150 is stored by the data sharing system 104. However, in an embodiment, the user data 150 can be stored remotely and accessed by the data sharing system 104. The third party system can communicate a sharing request 154 to the data sharing system 104, which can assess the requested as discussed herein. The sharing request 154 can include a request that may include one or more data field requests for associated records. For example, the sharing request 154 may include a request for all records for users in the state of Texas (data field: state of residence) who have car insurance for a car purchased less than three years old (data fields: insurance status; car model year). The sharing request 154 can include request for names and residence addresses, demographic information (data fields: gender, age), and occupation information. The data corresponding to the sharing request 154 may be a subset of all user data 150 of the system 104. Further, it should be understood that the third party system 105 may not have knowledge of a number of records in the user data 150 corresponding to the request. Therefore, the sharing request 154 may specific all or any available records or a minimum number of records.

If the request is granted, the shared user data 156 is communicated to the third party system, e.g., via communication circuitry 160. In an embodiment, the shared user data 156 can be accessed from a remote memory by the third party system 105 using authentication information that is provided by the data sharing system 104 to the third party system 105 as part of granting the sharing request 154. It should be understood, as provided herein, the shared user data 156 may correspond to all or only some of the data in the sharing request 154. Further, the shared user data 156 may be encrypted, tokenized, anonymized, or otherwise modified as generally discussed herein.

As part of the sharing request 154, the third party system 105 can provide details about storage 164 for the shared user data 156 and communication protocols 166, internal and external, for the third party system 105. Granting the sharing request 154 can be based on an evaluation of the storage parameters, such as the security of the storage 164 or the data purging protocols. Granting the sharing request 154 can additionally or alternatively be based on the assessed security of the communication protocols 166. In addition, the sharing request can define the permitted uses of the shared user data 156. For example, in an embodiment, the shared user data 156 can be provided to an approved list of other entities 170 or the shared user data 156 can be shared only if the third party system 105 does not share the data with other entities 170. The data sharing system 104 can receive reports of data breaches 172.

In an embodiment, the data breaches can be a result of improper security procedures related to the communication protocols 166 and/or system intrusions. Additionally or alternatively, the data breaches can be a result of improper sharing of the shared user data 156 with the other entities 170. That is, the third party system 105 may improperly release all or part of the shared user data 156. The system 104 may use a data breach tracker to identify improperly released shared user data 156.

Figure 3:
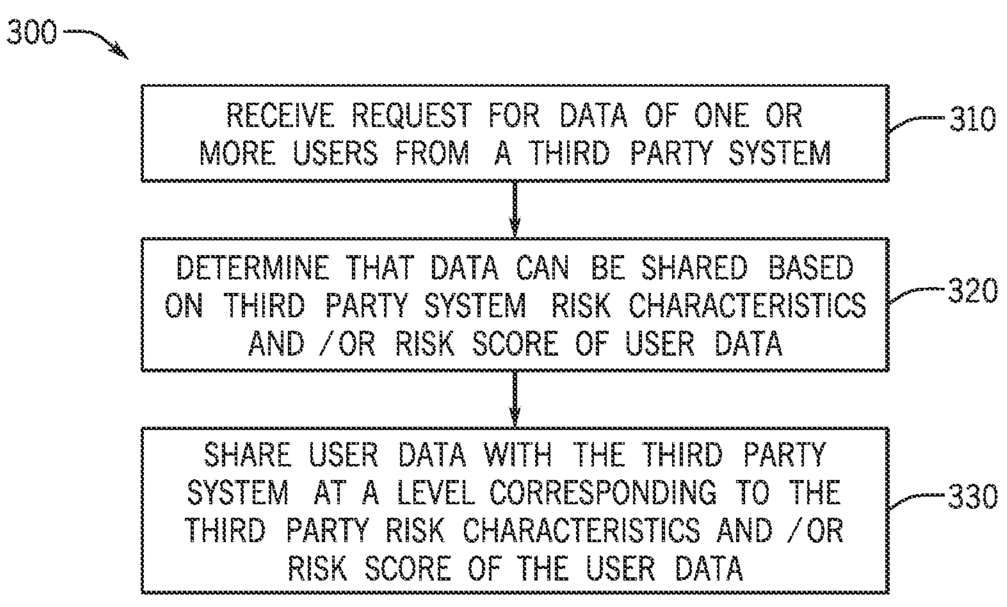
FIG. 3 is a flow diagram of an example method of data sharing, in accordance with an embodiment.

FIG. 3 is a flow diagram of an example method 300 of data sharing, in accordance with an embodiment. The steps or blocks may be performed in the operating environment 100 using one or more of the components described with respect to the disclosed embodiments. For example, the method 300 may be performed in conjunction with one or more components illustrated in FIG. 16, such as the processor 1610 executing operations stored in the memory 1620.

In block 310, a request for user data 150 is received from the third party system 105. It should be understood that the data sharing, as disclosed herein, may be pushed or pulled to the third party system 105, and that the data sharing may be initiated by a request from the third party system 105 to the data sharing system 104 or vice versa. Further, initiation of data sharing may include authentication steps to authenticate an approved third party system 105. In block 320, the data sharing system 104 determines whether data can be shared. In an embodiment, the data sharing system 104 can use a rules-based system to determine whether the third party system 105 will be allowed to access the requested user data based on the data characteristics and/or characteristics of the third party system 105. In block 330, shared user data 156 is provided access to the third party system 105 based on the determination. In an embodiment, the data sharing can be at a level commensurate with the data characteristics and/or characteristics of the third party system 105. For example, if the requested user data of the sharing request 154 is assessed to have a high risk score (see FIG. 4), only a portion of the requested user data can be provided such that the risk score of the shared user data 156 is below a risk score threshold. This can be accomplished by declining to share data from high-risk data fields (e.g., last name, occupation) to prevent the shared user data 156 being linked back to an individual user. In another embodiment, the characteristics of the third party system 105 can be based on adhering to particular storage parameters and communication protocols 166. The data sharing system 104 can require that the shared user data 156 is communicated via a particular secure communication protocol 166.

Figure 4:
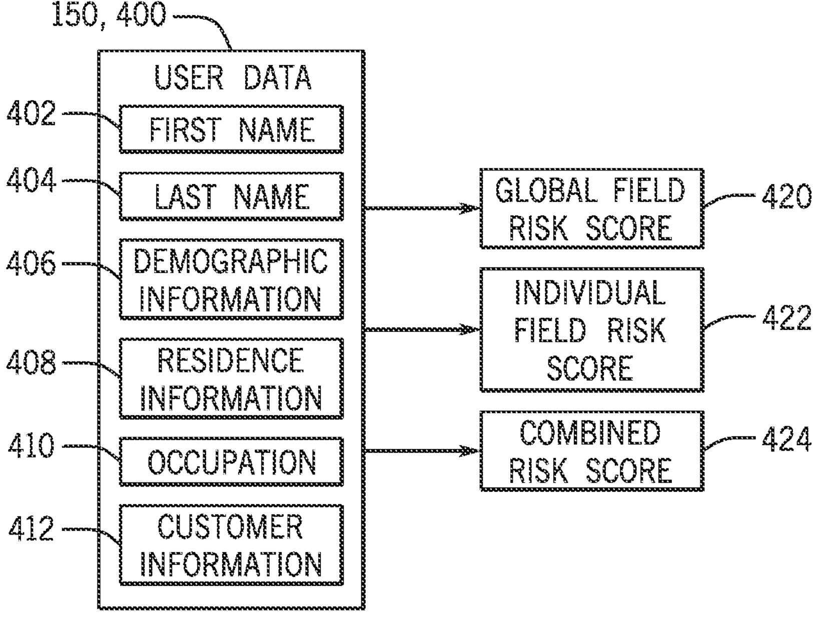
FIG. 4 is a block diagram of risk scores for data fields of user data, in accordance with an embodiment.

FIG. 4 is a block diagram of risk scores for data fields of an example of user data 150, illustrated as user data 400. The user data 400 may be organized in a database, such as dBase, Paradox, IMS, and Oracle. In a typical database, data is structured in a hierarchical arrangement. A unit of data can be stored in a data field as part of a data record for an individual user. Thus, each user having user data 400 stored in the data sharing system 104 can have a data records that includes multiple data fields. Examples of data fields can include first name 402, last name 404, demographic information 406, address 408, occupation 410, or other user or customer information 412.

A data field can have a global risk (e.g., a global risk in general for sharing first name data fields) as well as a specific risk (e.g., certain first names are uncommon, and an uncommon first name carries a higher privacy risk). Thus, the system 104 can take into account both global risk for a data field as well as individual risk for data fields that may have variability in specific risk depending on the content.

Accordingly, an individual data field can have a global field risk score 420 that can be applied across the entire field. For example, for an arbitrary scale (e.g., 0-1), a first name field 402 may have a lower risk score (e.g., 0.5) relative to a last name field (e.g., 0.8), because last names may be more identifying for individual users. However, the particular data for an individual user can also be assessed. Certain first names may be more unique or more common. Thus, an individual field risk score 422 can be determined for an individual user before sharing the data. The first name "JOHN" will carry both a global field risk score 420 reflective of global first name risks and an individual field risk score 422 reflective of the risk of "JOHN" relative to other first names. In an embodiment, the individual field risk score can be based on census data, whereby more common names have a lower risk score. The global risk score 420 for each field and the individual risk score 422 (where applicable) can be combined (e.g., added) to generate a combined risk score 424. In an embodiment, the more fields that are shared within the user data, the higher the potential risk score. Thus, sharing fewer fields can lower a risk of data sharing. However, certain fields, such as state of residence, can carry a minimal risk score (e.g., 0.1 on an arbitrary 0-1 scale). In an embodiment, certain data fields can be considered to have no or zero risk. Further, a risk score can be increased based on sharing of fields in combination, such as first name and last name together. In an embodiment, a data sharing request that includes both first name and last name is scored to weight increased risks. In one embodiment, a risk score can be based on a total number of fields that are shared.

Risk level metrics may include: Where and how long will the data be stored? For example, what are the storage parameters of the data storage 164? In an embodiment, a more frequent data purging schedule is considered lower risk than a less frequent data purging schedule. Ongoing retention of data can be considered a highest level risk. A risk metric may include an internal uses case, such as how the data be used and transferred (e.g., what are the communication protocols 166). Additional risk metrics may include existence of prior data breaches of the third party, whether the system 104 provided the user data 150 to other third party systems 105, the nature of the shared data fields and how can they be combined. For example, a rules-based system can specify that data field A and data field B should never be comingled under the same identity/record because there is enough uniqueness to actually identify an individual. That is, both data field A and data field B cannot be shared with a single third party system 105 for the same user record.

The data sharing request may set forth a desired number of records or may set forth a request for all records for a particular data field. Thus, evaluation of the risk score can include a total combined score for all records matching the request.

In an embodiment, the disclosed risk score may be provided as a combined risk metric that may include a reference to the score relative to preset risk thresholds. For example, an output of SHARING REQUEST RISK SCORE: 7500 (HIGH RISK) indicates that the total risk score is above a preset threshold.

In another embodiment, the risk score may be displayed as a risk map that is transmitted to or accessible to the third party system 105 via a user interface. In an embodiment, the risk map may be organized by data fields. The risk map may show data fields that, for all records in the request combined, are indicated as being at an acceptable risk level or below a preset risk threshold as green and data fields above the present risk threshold as red. The risk map may further indicate different levels of risk with different levels of red or green colors within a color gradient. Thus, an end user of the risk map can quickly assess which individual data fields may be introducing the most increase in risk in a sharing request 154 and provide notifications to the third party system 105 to flag those fields in the sharing request 154.

In an embodiment, the system 104 can provide an internal or external report in which the highest-risk data fields are ranked. In an embodiment, additional information such as a percentage of contributing risk for high risk data fields (e.g., total percentage contribution to the overall risk score) can be provided as well as a percentage over the threshold value. Thus, the third party system 105 can identify that a particular data field is generating a relatively high percentage of the overall risk (e.g., >10%), and that removal of the field from the sharing request 154 would bring the sharing request 154 into risk compliance. The user interface can permit selection of particular data fields for removal from the sharing request 154 and display a recalculation of the risk map with the selected fields removed. Thus, a user of the third party system 105 can try different modifications of the initial sharing request 154 to determine if removing certain data fields (and potentially adding other, lower-risk, substitutes) is sufficient to have the modified request approved before confirming which modification to resubmit. For example, the user of the third party system can remove RESIDENCE ADDRESS from the sharing request 154 and view a recalculated risk map that replaces this data field with ZIP CODE, CITY OF RESIDENCE, and/or STATE OF RESIDENCE. The risk map may indicate that replacing the RESIDENCE ADDRESS data field with ZIP CODE does not bring the sharing request 154 into compliance, but replacing the RESIDENCE ADDRESS data field with CITY OF RESIDENCE does bring the sharing request 154 into compliance. Thus, the end user of the third party system 154 can modify the sharing request 154 accordingly.

Figure 5:
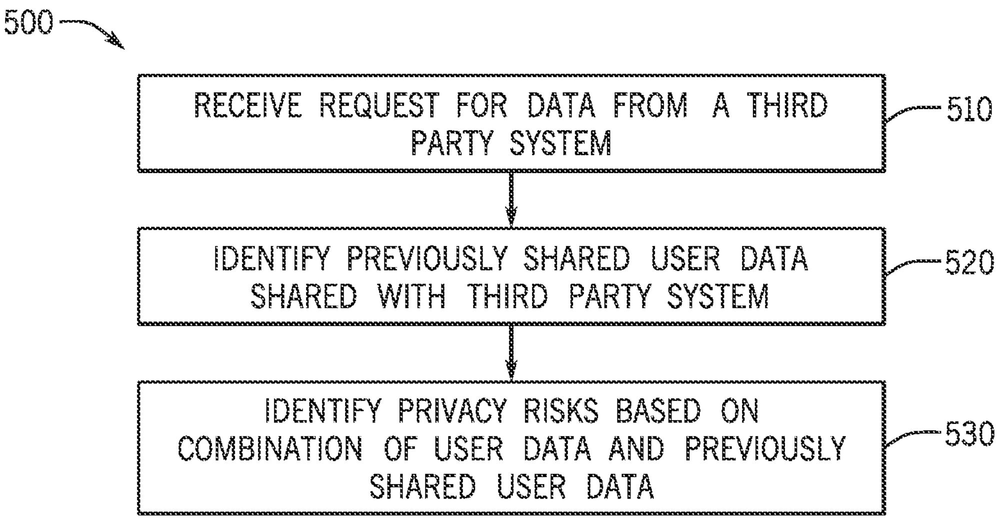
FIG. 5 is a flow diagram of an example method of data sharing, in accordance with an embodiment.

FIG. 5 is a flow diagram of an example method 500 of data sharing, in accordance with an embodiment. The steps or blocks may be performed in the operating environment 100 using one or more of the components described with respect to the disclosed embodiments. For example, the method 500 may be performed in conjunction with one or more components illustrated in FIG. 16, such as the processor 1610 executing operations stored in the memory 1620.

In block 510, a request for user data 150 is received from the third party system 105 as generally discussed herein with respect to the disclosed embodiments (e.g., see FIG. 3). In block 520, the data sharing system 104 identifies, if any, previously shared user data previously shared with the third party system 105. Based on the identification of the previously shared user data and the risk associated with user data in a pending sharing request 154, the system 104 can identify privacy risks at block 530.

For example, the third party system 105 may be a frequent sharing partner, and may have received thousands of shared records that comprise the previously shared user data. Thus, at the time of the sharing request 154 is made, the third party system 105 can carry initial risk based on the previously shared user data. The initial risk can be characterized by the risk score of the previously shared user data. In an embodiment, if the initial risk is lower than a threshold, the third party system 105 can be determined to be eligible for receiving additional shared data. However, the sharing request 154 may exceed the available additional risk that the third party system 105 is allotted. That is, the sharing request 154 has an integral risk associated with the contents of the requested user data.

Figure 6:
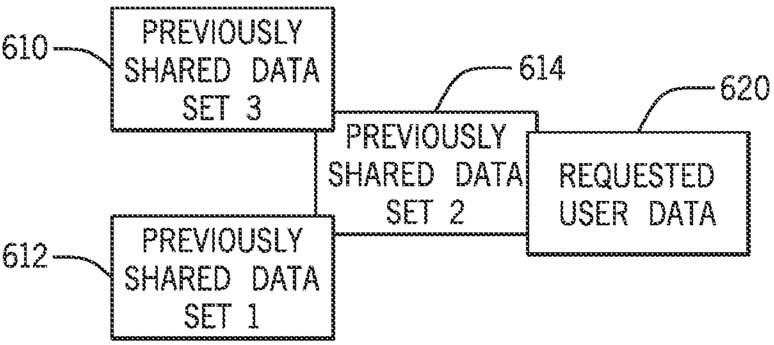
FIG. 6 is a schematic illustration of overlap between requested user data and previously shared data that may be associated with a privacy risk, in accordance with an embodiment.

Further, in certain embodiments, the particular combination of the data in the already shared user data and the data in the sharing request 154 can pose a privacy risk for one or more user records. FIG. 6 is a schematic illustration of overlap between requested user data and previously shared data with the third party system 105. The third party system 105 has received previously shared data set 1 (block 610), previously shared dataset 2 (block 612), and previously shared dataset 3 (block 614). In the illustrated embodiment, these data sets 610, 612, 614 are not identical to one another but are but partially overlapping. Further, the requested user data 620 can present an additional opportunity for overlap. For example, the overlapping data sets can include data from different data fields that are all linked to a particular user (e.g., via a name, account number, or userID). In isolation, the shared data fields may not be a risk. However, in aggregation, the number of shared data fields may permit assembly of sufficient information about the user to be a privacy risk. Thus, the evaluation of risk can include an assessment of whether, in aggregation, the data in the requested user data 620—when combined with previously shared data-is a privacy risk.

Figure 7:
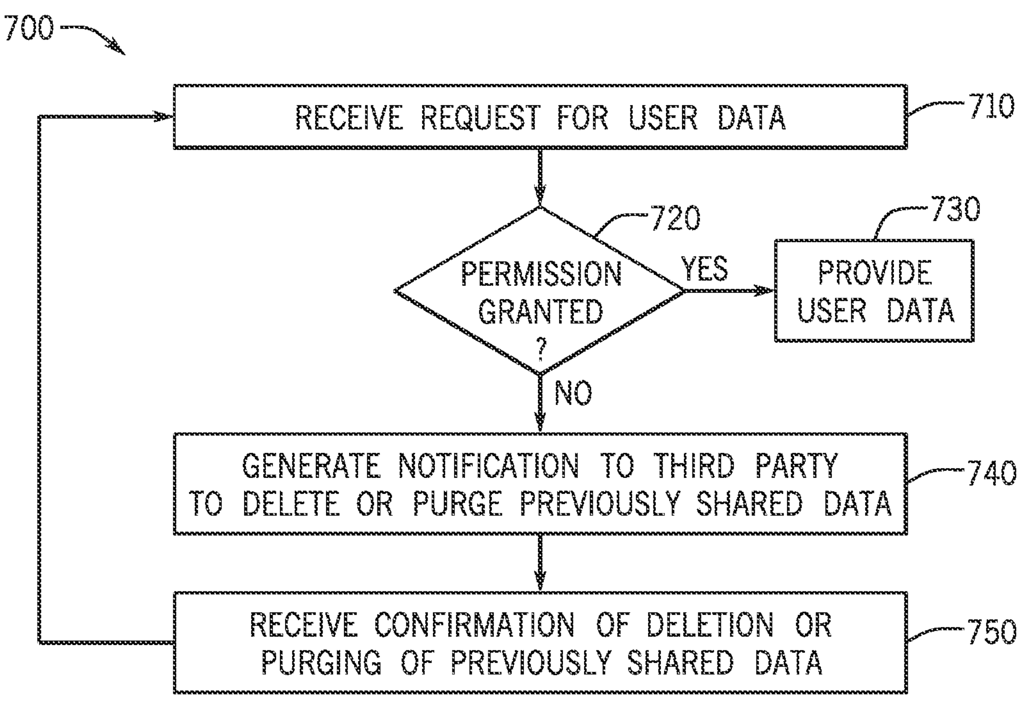
FIG. 7 is a flow diagram of an example method of data sharing responsive to third party risk mediation action, in accordance with an embodiment.

FIG. 7 is a flow diagram of an example method 700 of data sharing responsive to third party risk mediation action, in accordance with an embodiment. The steps or blocks may be performed in the operating environment 100 using one or more of the components described with respect to the disclosed embodiments. For example, the method 700 may be performed in conjunction with one or more components illustrated in FIG. 16, such as the processor 1610 executing operations stored in the memory 1620.

In block 710, a request for user data 150 is received from the third party system 105 as generally discussed herein with respect to the disclosed embodiments (e.g., see FIG. 3). In block 720, the data sharing system 104 identifies privacy risks and determines whether to grant the request as discussed herein in block 720. If privacy risks are not identified, the user data is shared in block 730. However, in an embodiment, the system 104 provides a notification back to the third party system 105 with actions that can be taken to reduce data sharing risk. For example, the notification can provide an instruction to at least partially delete or purge previously shared user data in block 740. Upon receiving confirmation of the purge of previously shared user data in block 750, the third party system can return to block 710 to resubmit the request. Alternatively, the confirmation can trigger automatic sharing of the requested user data.

The disclosed techniques address data privacy concerns that may arise when third party systems 105 assemble information that can uniquely identify a particular user and associate that user with other data that is private or protected. For example, unique identifiers (e.g., name, SSN, address) present a heightened data sharing risk. Accordingly, it may be preferable to not share such identifiers with third party systems 105. However, such identifiers are useful when obtaining data analytics from third party systems 105. For example, the shared data may be provided to the third party system 105 for input into analysis engines. In such cases, it can be useful to track the analyzed data back the particular unique identifiers. In one example, the analytics may identify particular users who are experiencing credit card fraud. Provided herein are also techniques to modify, tokenize, or encrypt data to preventing identification of individual on the third party system end. In other embodiments, the shared data may include time elapsing or use elapsing tokens or and keys. This could include generating a token that expires or changes after a time or after a number of uses. The token may be incorporated into a user-linked hash. By having date mapped keys, more complicated combinations can be provided with more ways to modify the same person's data to maintain privacy. This way an analysis from a third party using older data can be identified. With such data modification in the shared data, the third party system 105, if hacked, could not be used to identify the particular users.

Figure 8:
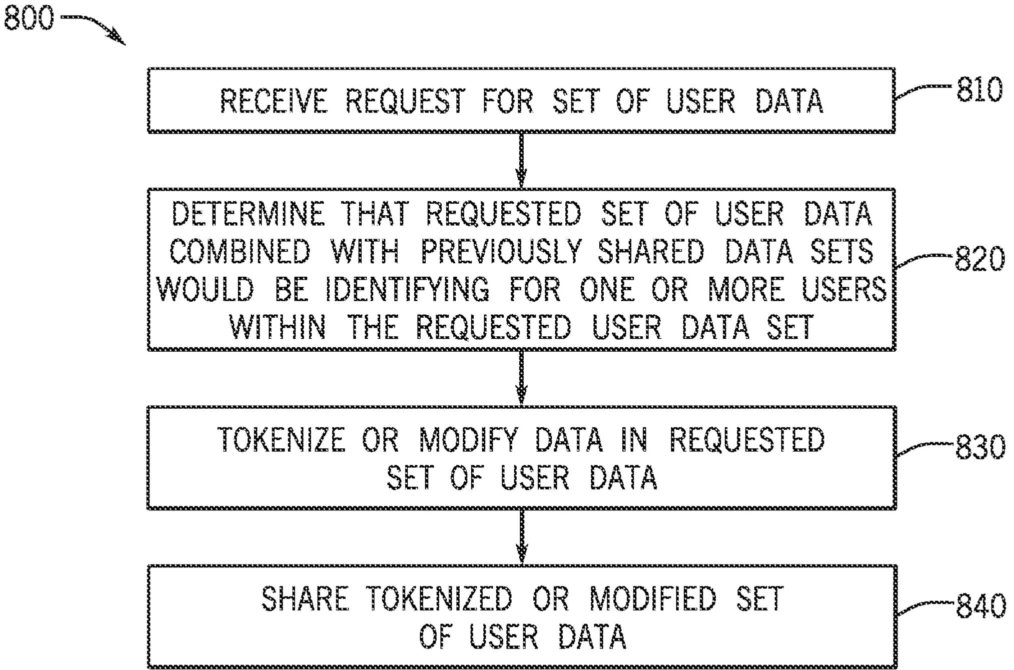
FIG. 8 is a flow diagram of an example method of data sharing of modified or tokenized data, in accordance with an embodiment.

In another embodiment, private data can be aggregated in a way that allows provision of a "persona" that is of interest while not actually identifying a person. The user data may, in an embodiment, have one or more dummy records or dummy data fields added to the user data to facilitate tracking. The dummy records can be a sufficiently minor components of the user data such that analytics with the user data are not significantly impacted. For example, a dummy user FIG. 8 is a flow diagram of an example method 800 of data sharing of tokenized or modified user data, in accordance with an embodiment. The steps or blocks may be performed in the operating environment 100 using one or more of the components described with respect to the disclosed embodiments. For example, the method 800 may be performed in conjunction with one or more components illustrated in FIG. 16, such as the processor 1610 executing operations stored in the memory 1620.

In block 810, a request for user data 150 is received from the third party system 105 as generally discussed herein with respect to the disclosed embodiments (e.g., see FIG. 3). In block 820, the data sharing system 104 determines that the requested set of user data, in combination with previously shared user data sets, would be identifying or would otherwise pose privacy risks for one or more users. The system 104 can tokenize or modify the user data in the user request at block 830 and share the tokenized or modified set of user data at block 840. The tokenized or modified set of user data may include data for which the user names or unique userIDs are tokenized in a hash table.

Figure 9:
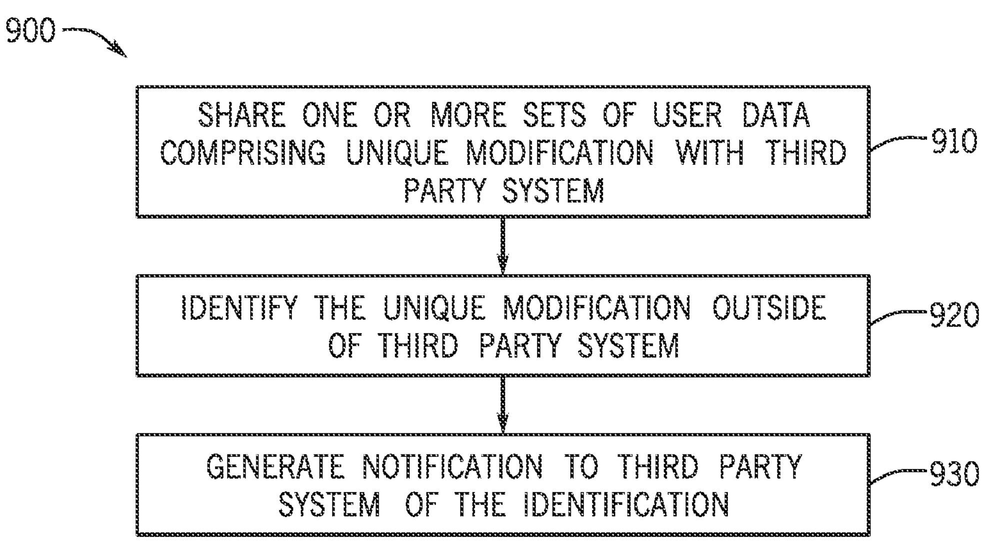
FIG. 9 is a flow diagram of an example method of data sharing of user data having a unique marker in the shared user data, in accordance with an embodiment.

FIG. 9 is a flow diagram of an example method 900 of data sharing of user data having a unique marker in the shared user data. The steps or blocks may be performed in the operating environment 100 using one or more of the components described with respect to the disclosed embodiments. For example, the method 900 may be performed in conjunction with one or more components illustrated in FIG. 16, such as the processor 1610 executing operations stored in the memory 1620.

In block 910, one or more sets of user data having a unique modification (e.g., a unique marker) are shared with third party system 105. In block 920, the unique modification is identified outside of the third party system 105, indicating a data breach or inappropriate sharing. For example, unique markers in image data may be identified in a reverse image search. A data breach tracker may track internet presence of a dummy record or may track messages or contacts with a dummy email or dummy phone number bundled in the user data as an indicator of the data breach or inappropriate sharing. In another example, the dummy record may include a dummy userID, and the system can monitor attempts to log in to an account using the dummy userID. The system 104 generates a notification that the unique modification was identified to the third party system at block 930.

In an embodiment, the notification may further include instructions for the third party system 105 to undertake risk mediation actions, such as data purging, as a result of the identification. In another embodiment, identification of the unique modification outside of the third party system 105 can trigger activation of expiring features of the shared data. For example, in one example, the third party system 105 may query the system 104 for updates or changes in status for the shared data. However, in the event of the identified unique modification, the update permissions can be revoked.

Figure 10:
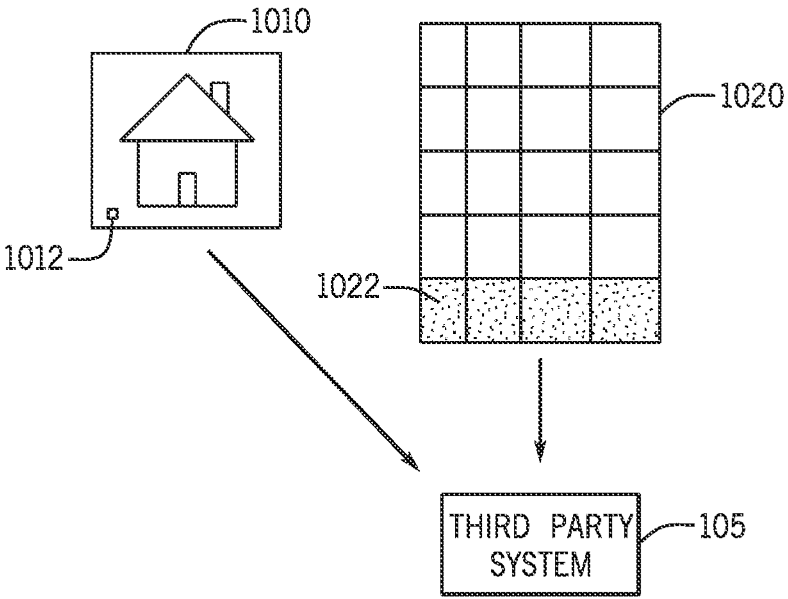
FIG. 10 is a schematic illustration of unique markers in the shared user data, in accordance with an embodiment.

FIG. 10 is a schematic illustration of modification of the shared user data with unique markers. One or more aspects of the user data can be modified before sharing, while the original unmodified version of the user data is retained by the data sharing system 104. Thus, the presence of the unique markers outside of the third party system 105 can be traced back to the system 105 with which the user data was sharing. Each sharing event can be associated with a different unique modification, permitting improved tracking of the shared user data. In one example, image data 1010 is modified with an image marker 1012. The image marker 1020 can be a digital watermark that is a minor portion of the image, e.g., a modification that modifies 50 or fewer pixels. In one embodiment, the modification can be limited to a portion of the image data 1010 that does not include features of interest. For example, in the depicted example, the image data 1010 is representative of a house, and the image marker 1012 is positioned in the surrounding area. Accordingly, in one embodiment, the image data 1010 may be analyzed using image recognition features to position the image marker 1012 in a background portion. In another example, the shared data can include database data 1020 organized into records. The data can include a dummy record 1022 that corresponds to a dummy user and that includes information that, when accessed, can be traced back to the third party system 105.

Figure 11:
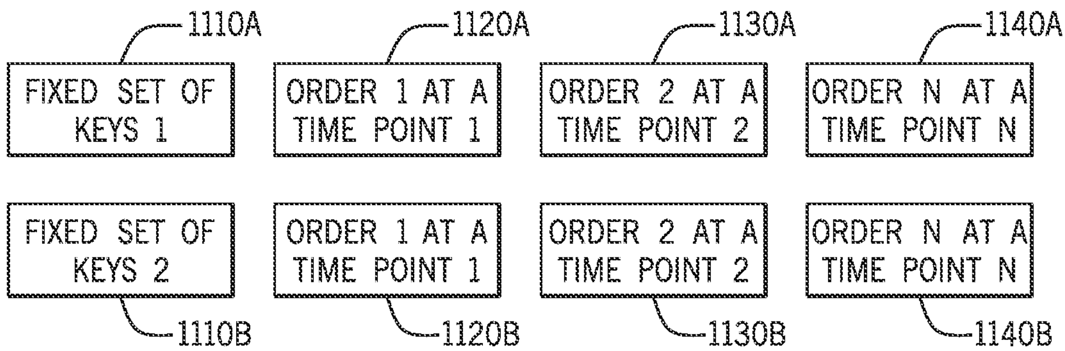
FIG. 11 is a schematic illustration of expiration of tokenized shared user data using sets of fixed keys in different orders based on time points, in accordance with an embodiment.

To prevent shared user data from being linked back to a real-world user (e.g., a customer of the owner of the data sharing system 104), the data can be modified by replacing certain data fields that are potentially identifying with FIG. 11 is a schematic illustration of expiration of tokenized shared user data using sets of fixed keys in different orders based on time points. For example, for a set of users whose records are stored under their names, the user first names can be tokenized using a fixed set of keys. Thus, a user John Smith is associated with a first key token, user Robert Smith is associated a second key token, and so on. The data sharing system 104 can link the real user names to the tokens, but the third party system 105 does not receive any real user names. Accordingly, the real users names can be represented by a fixed set of keys 1110A. Other data fields in the records can also be tokenized, with a fixed set of keys 1110B, or additional fixed sets of keys. To gain increased functionality, the fixed sets of keys 1110 can be scrambled at different time points. Thus, for data shared at time point 1, the order of the keys 1110A is order 1 1120A. Subsequent sharing of the data can trigger different orders 1130A, 1140A. The data sharing system 104 keeps a records of the various orders (and associated data) of the fixed set of keys 1110A at the various time points. A similar process can occur for other tokenized data fields, e.g., tokenized user the fixed set of keys 1110B and at orders 1120B, 1130B, 1140B at various time points. The unique combination and order of the keys in the different fields will only have one answer for each sharing event. The advantage of using the fixed set or sets of keys is that the system keeps track of fewer keys overall.

Figure 12:
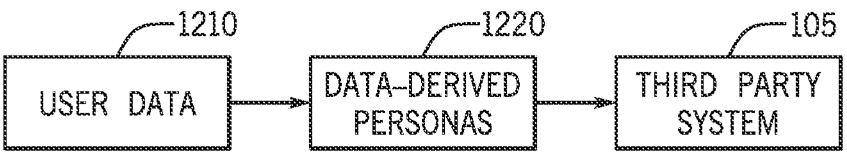
FIG. 12 is a schematic illustration of generating and sharing of persona data, in accordance with an embodiment.

FIG. 12 is a schematic illustration of generating and sharing of persona data. The user data 1210 can be analyzed to generate one or more data-derived personas 1220 that represent hypothetical users and their associated data. An advantage of the data-derived persona is that the persona is not identifying for any individual user. Thus, the various data values or information associated with each persona cannot be linked back to any individual user. Thus, the personas do not include user name information or address information, but may include information such as a representative zip code or housing type (apartment vs/house or renter vs. owner).

User data can be segmented by demographic data into subsets, and the segmented subsets can be the basis of one persona. In an embodiment, all users under 25 having a particular income range and residing in a particular city can be used to generate a persona 1220. The persona 1220 can include data values that represent a range or average/median of data values for a particular data field for many users. For example, if the data field is MONTHLY INSURANCE RATE, the associated data item can represent the range that is true for the 25%-75% percentiles in the data.

Third parties may seek to obtain user data from the data sharing system 104 to run analytics, perform vendor operations as part of a vendor relationship, or assess compliance. A data sharing search tool can be made available to third parties to allow these third parties to define the set of desired data fields and query the system to determine if the combination of data fields is permitted to be shared or available.

The tool would allow the third party system user to define each use case and, in an embodiment, the type of data needed for that use case. Each use case would have certain associated data types that can be accessed. The search tool would return the available data fields. If a use case should not require certain data, it will not be shared. Multiple use cases for the same third party may be blocked when the system 104 determines that combinations would be overly risky as generally discussed herein.

The search tool is a dynamic tool that can provide user data de novo based on each query. The tool gives only certain data fields of a set of available data fields based on risk score. Further, the search tool could provide dynamic tokenization of certain data fields based on 1) prior asks or shares or 2) overall risk score for the third party system 105. The tool could also provide suggestions as to how to obtain additional data fields by purging data from previous asks. The same user data fields can be tokenized differently for each separate sharing event so that the data sets from Share #1 and Share #2 cannot be merged.

In an embodiment, inputs to the search tool can be used to identify most-requested data fields for third party system 105. and provide user discounts for sharing more valuable data fields. The value can be determined based on frequency of queries to the tool.

Figure 13:
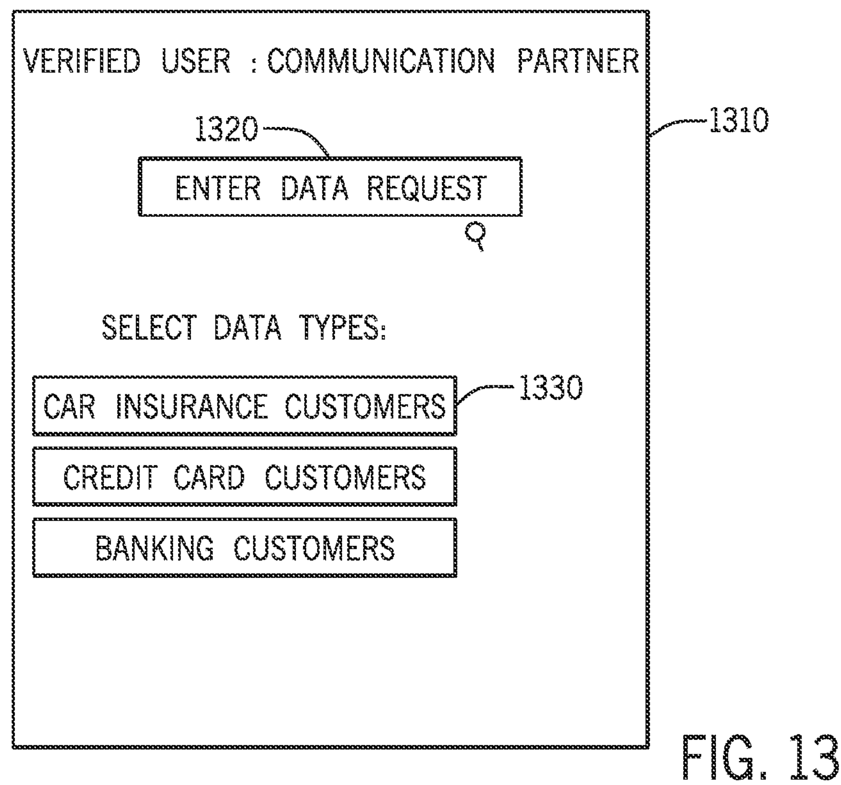
FIG. 13 is a schematic illustration of a user interface for a data sharing tool, in accordance with an embodiment.
Figure 14:
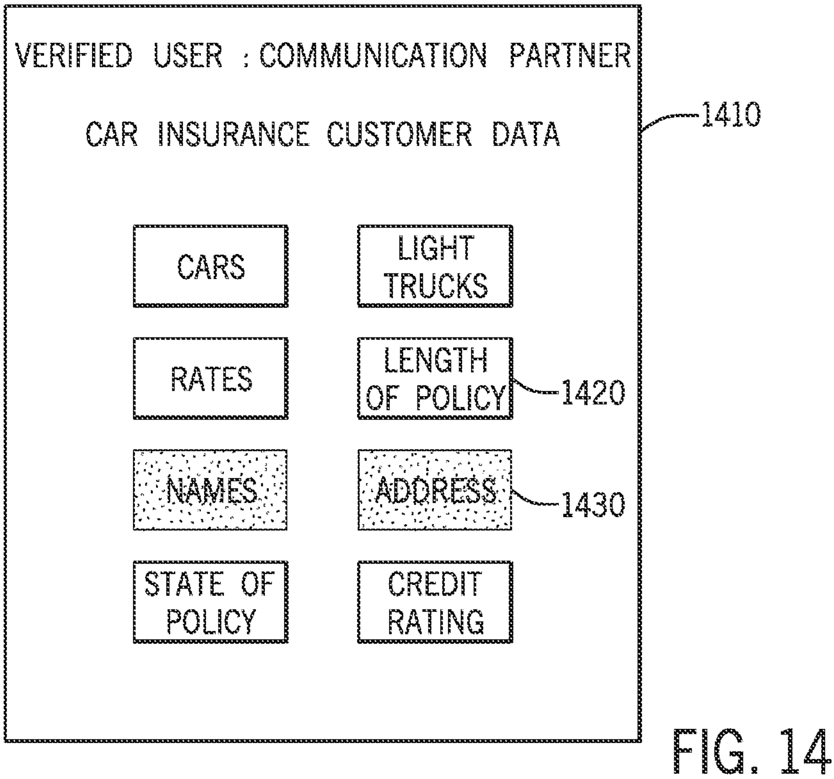
FIG. 14 is a schematic illustration of a user interface for a data sharing tool, in accordance with an embodiment.

FIGS. 13-15 show schematic illustrations of user interfaces for a data sharing tool. In FIG. 13, a user interface 1310 can be accessed by a third party system 105. In an embodiment, the user interface 1310 can include a data input element, such as a search bar 1320, that receives keywords or search terms. The user interface may additionally or alternatively include selectable icons 1330 for data types that are available. In one example, the user interface 1310 may be configured differently for verified third party systems 105 that have a previous relationship with the data sharing system 104. For unverified users, the selectable icons 1330 may not be present.

FIG. 14 shows an example user interface 1410 available to the verified third party system 105 after selection of a particular data type (e.g., see FIG. 13, such as via selectable icons 1330). For end users interested in car insurance customer data, the user interface provides available data fields 1420 as well as, in an embodiment, icons representative of unavailable data fields 1430. An advantage of the search-driven user interface is that, rather than responding to third party system requests that may or may not be granted, the third party system 105 can instead select available data of interest rather than guessing which fields may permissible in a request. The available data can be determined based on previously shared data with the third party system 105 as generally discussed herein. For example, the available data can be selected to lack overlap with previously shared data. The lack of overlap can be determined by data that, when shared, does not add to shared data fields for a particular user record. For example, if two or more data fields for USER 1 are already shared that include income range and zip code, then the available data for sharing will not include additional data fields for USER 1, such as age, address, occupation.

In certain cases, the system 104 can, via the search tool, provide additional information as to how to access the unavailable data fields 1430. As shown in FIG. 15, selecting one of the unavailable data fields, illustrated here as the NAMES field, brings up a user interface 1510 with notifications and instructions as to how the third party system 105 can access currently unavailable data fields.

Figure 16:
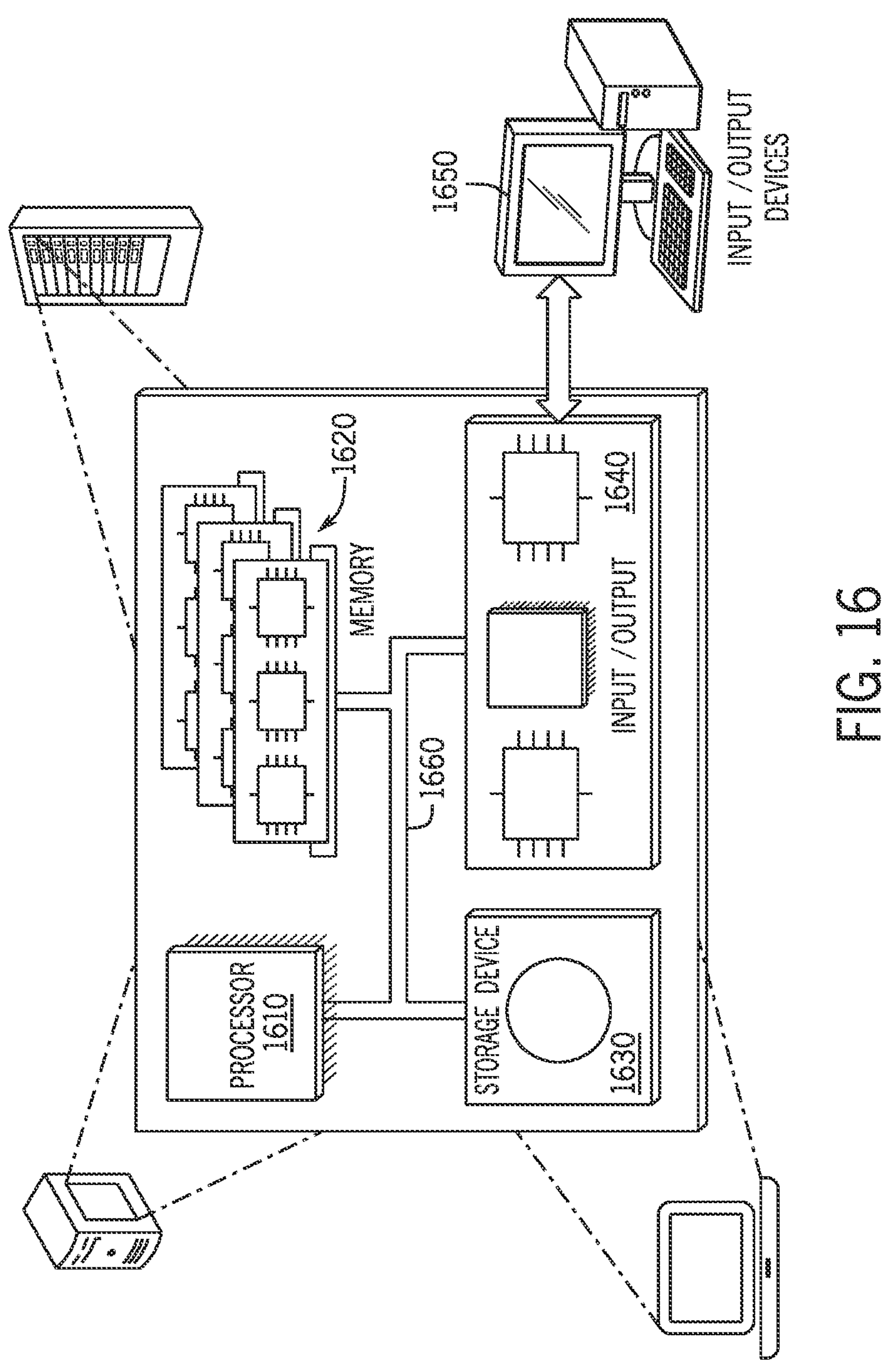
FIG. 16 is a schematic illustration of an example computing system that may be used in conjunction with the disclosed techniques, in accordance with an embodiment.

FIG. 16 illustrates an example computing system 1600 that the embodiments described herein may use to perform their respective operations. The system 1600 may be used for any of the operations described with respect to the various embodiments described herein, including the data sharing system 104 described herein. For example, the system 1600 may be included, at least in part, in one or more of computing device(s) or system(s) described herein. In certain embodiments, the system 1600 may include one or more processors 1610, one or more memory 1620, one or more storage devices 1630, and one or more input/output (I/O) devices 1650 controllable via one or more I/O interfaces 1640. The various components 1610, 1620, 1630, 1640, or 1650 may be interconnected via at least one system bus 1060, which may enable the transfer of data between the various modules and components of the system 1600.

In certain embodiments, the processor(s) 1610 may be configured to process instructions for execution within the system 1600. The processor(s) 1610 may include single-threaded processor(s), multi-threaded processor(s), or both. The processor(s) 1610 may be configured to process instructions stored in the memory 1620 or on the storage device(s) 1630. For example, the processor(s) 1610 may execute instructions for the various software module(s) described herein. The processor(s) 1610 may include hardware-based processor(s) each including one or more cores. The processor(s) 1610 may include general purpose processor(s), special purpose processor(s), or both.

In certain embodiments, the memory 1620 may store information within the system 1600. In certain embodiments, the memory 1620 includes one or more computer-readable media. The memory 1620 may include any number of volatile memory units, any number of non-volatile memory units, or both volatile and non-volatile memory units. The memory 1620 may include read-only memory, random access memory, or both. In certain embodiments, the memory 1620 may be employed as active or physical memory by one or more executing software modules.

In certain embodiments, the storage device(s) 1630 may be configured to provide (e.g., persistent) mass storage for the system 1600. In certain embodiments, the storage device(s) 1630 may include one or more computer-readable media. For example, the storage device(s) 1630 may include a floppy disk device, a hard disk device, an optical disk device, or a tape device. The storage device(s) 1630 may include read-only memory, random access memory, or both. The storage device(s) 1630 may include one or more of an internal hard drive, an external hard drive, or a removable drive.

One or both of the memory 1620 or the storage device(s) 1630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1600. In certain embodiments, the CRSM may include a data store that provides storage of computer-readable instructions or other information in a non-transitory format. The CRSM may be incorporated into the system 1600 or may be external with respect to the system 1600. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 1610 and the memory 1620 may be supplemented by, or incorporated into, one or more application-specific integrated circuits (ASICs).

In certain embodiments, the system 1600 may include one or more I/O devices 1650. The I/O device(s) 1650 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 1650 may also include one or more output devices such as a display, LED(s), an audio output device (e.g., a speaker), a printer, a haptic output device, and so forth. The I/O device(s) 1650 may be physically incorporated in one or more computing devices of the system 1600 or may be external on one or more computing devices of the system 1600.

In certain embodiments, the system 1600 may include one or more I/O interfaces 1640 to enable components or modules of the system 1600 to control, interface with, or otherwise communicate with the I/O device(s) 1650. The I/O interface(s) 1640 may enable information to be transferred in or out of the system 1600, or between components of the system 1600, through serial communication, parallel communication, or other types of communication. For example, the I/O interface(s) 1640 may comply with a version of the RS-1032 standard for serial ports, or with a version of the IEEE AA884 standard for parallel ports. As another example, the I/O interface(s) 1640 may be configured to provide a connection over Universal Serial Bus (USB) or Ethernet. In certain embodiments, the I/O interface(s) 1640 may be configured to provide a serial connection that is compliant with a version of the IEEE AA994 standard.

In certain embodiments, the I/O interface(s) 1640 may also include one or more network interfaces that enable communications between computing devices in the system 1600, or between the system 1600 and other network-connected computing systems. The network interface(s) may include one or more network interface controllers (NICs) or other types of transceiver devices configured to send and receive communications over one or more communication networks using any network protocol.

Computing devices of the system 1600 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1600 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 500 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 500 that includes a back-end component, e.g., as a data server, or that includes a middleware component, e.g., an application server, or that includes a front-end component, e.g., a client computer having a graphical user interface or a web browser through which a user may interact with an with the system 500, or any appropriate combination of one or more such back-end, middleware, or front end components. The components of the system 500 may be interconnected by any appropriate form or medium of digital data communication, e.g., a communication network. Examples of communication networks include a local area network ("LAN") and a wide area network ("WAN"), e.g., the Internet.

In certain embodiments, the computing system 500 may include clients and servers. A client and server are generally remote from each other and typically interact through a communication network. The relationship of client and server arises by computer programs running on the respective computers and having a client-server relationship to each other. In certain embodiments, an application provides an interface for user interaction, such as a web interface or other graphical user interface (GUI).

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A data sharing system, the system comprising:
a memory storing executable instructions; and
a processor configured to execute the instructions to:
store user data of a plurality of users in the memory;
receive a request for the user data from a third party system;
access previously shared user data shared with the third party system;
identify a privacy risk based on a combination of the requested user data and the previously shared user data;
determine that a first data field in the previously shared user data and a second data field in the requested user data comprise a partial overlap of user data indicative of the privacy risk, wherein, both, the first data field and the second data field cannot be shared with the third party system;
transmit a notification to the third party system of the identified privacy risk, wherein the notification to the third party system of the identified privacy risk comprises an indication to delete the first data field from the previously shared user data;
transmit a notification to the third party system to modify the request for the user data to reduce the privacy risk; and
receive, from the third party system, an indication of a risk-mediation action for the previously shared user data.

2. The system of claim 1, wherein the notification comprises one or more data fields to remove from the request.

3. The system of claim 1, wherein the instructions comprise instructions to:
receive a modified request for the user data; and
share the user data in the modified request with the third party system.

4. The system of claim 3, wherein the previously shared user data comprises one or more unique markers.

5. The system of claim 1, wherein the instructions comprise instructions to identify high risk data fields in the requested user data.

6. The system of claim 5, wherein an identified high risk data field comprises a user name field, wherein the user name field has a global risk score for all user names and wherein each individual record in the user name field has an individual risk score based on a uniqueness metric of a first name and/or last name in the record.

7. The system of claim 6, wherein the individual risk score is based on census records.

8. The system of claim 1, wherein the risk-mediation action comprises deleting or purging at least some of the previously shared user data.

9. A data sharing system, the system comprising:
a memory storing executable instructions; and
a processor configured to execute the instructions to:
receive a request for user data stored in the memory from a third party system;
access previously shared user data shared with the third party system;

determine an initial risk of the third party system based on the previously shared user data shared with the third party system;

determine that the initial risk of the third party system is lower than a threshold risk score amount, wherein the initial risk of the third party system being lower than the threshold risk score is indicative of the third party system being eligible to receive additional shared user data;

identify a privacy risk based on a combination of the requested user data and the previously shared user data responsive to determining that the initial risk is lower than the threshold risk score;

determine that a first data field in the previously shared user data and a second data field in the requested user data comprise a partial overlap of user data indicative of the privacy risk, wherein, both, the first data field and the second data field cannot be shared to the third party system; and transmit an instruction to the third party system to purge the previously shared user data;

receive confirmation that the third party system has purged the previously shared user data; and share the user data with the third party system responsive to receiving the confirmation.

10. The system of claim 9, wherein the partial overlap comprises unique userIDs or user names, and wherein the user data in the request adds additional data fields to records for the unique userIDs or the user names in the combination.

11. The system of claim 1, wherein the notification to the third party system to modify the request for user data to reduce the privacy risk comprises an indication to remove the second data field from the request for the user data.

* * * * *